350-163.
2-19-74    XR    3,793,526    SR

United States Patent [19]
Collmann et al.

[11] 3,793,526
[45] Feb. 19, 1974

[54] APPARATUS FOR THE SIMULTANEOUS X-RAY EXAMINATION OF BOTH SIDE WALLS OF A MOTOR VEHICLE TIRE

[75] Inventors: Wilhelm Collmann; Udo Guldner, both of Lubeck, Germany

[73] Assignee: Collmann GmbH & Co. Spezialmaschinenbau KG

[22] Filed: Dec. 12, 1972

[21] Appl. No.: 314,323

[30] Foreign Application Priority Data
    Sept. 21, 1972  Germany............................ 2246290

[52] U.S. Cl.................. 250/360, 250/314, 250/494, 350/163
[51] Int. Cl............................ G01t 1/00, G01t 1/16
[58] Field of Search ........... 250/367, 368, 360, 494; 356/163, 164; 350/30

[56]           References Cited
             UNITED STATES PATENTS
3,388,631   6/1968   Glowa................................ 356/164
2,574,119  11/1951   Mottu ................................ 356/163
1,561,751  11/1925   Smith................................... 350/30
3,621,246  11/1971   Horsey............................... 250/360
3,614,432  10/1971   Green ................................ 250/360
3,244,878   4/1966   Stein et al........................... 250/314

Primary Examiner—Harold A. Dixon

[57]           ABSTRACT

This invention relates to apparatus for the simultaneous, continuous X-ray examination of both sidewalls of a drivably mounted expanded motor vehicle tire, of the kind comprising two X-ray tubes and two fluorescent screens with mirrors arranged subsequent to them to reflect the pictures on said fluorescent screens to a sensing-camera arrangement with reproduction on monitors. In the invention, the fluorescent screens arranged for location at least partly within the airspace of the tire, together with said mirrors. Each X-ray tube is situated opposite the side-wall of the tire facing it, and which is to be irradiated. The fluorescent screens are generally flat and are situated parallel or approximately parallel to each other and to the two side-walls of the tire within its air space.

8 Claims, 1 Drawing Figure

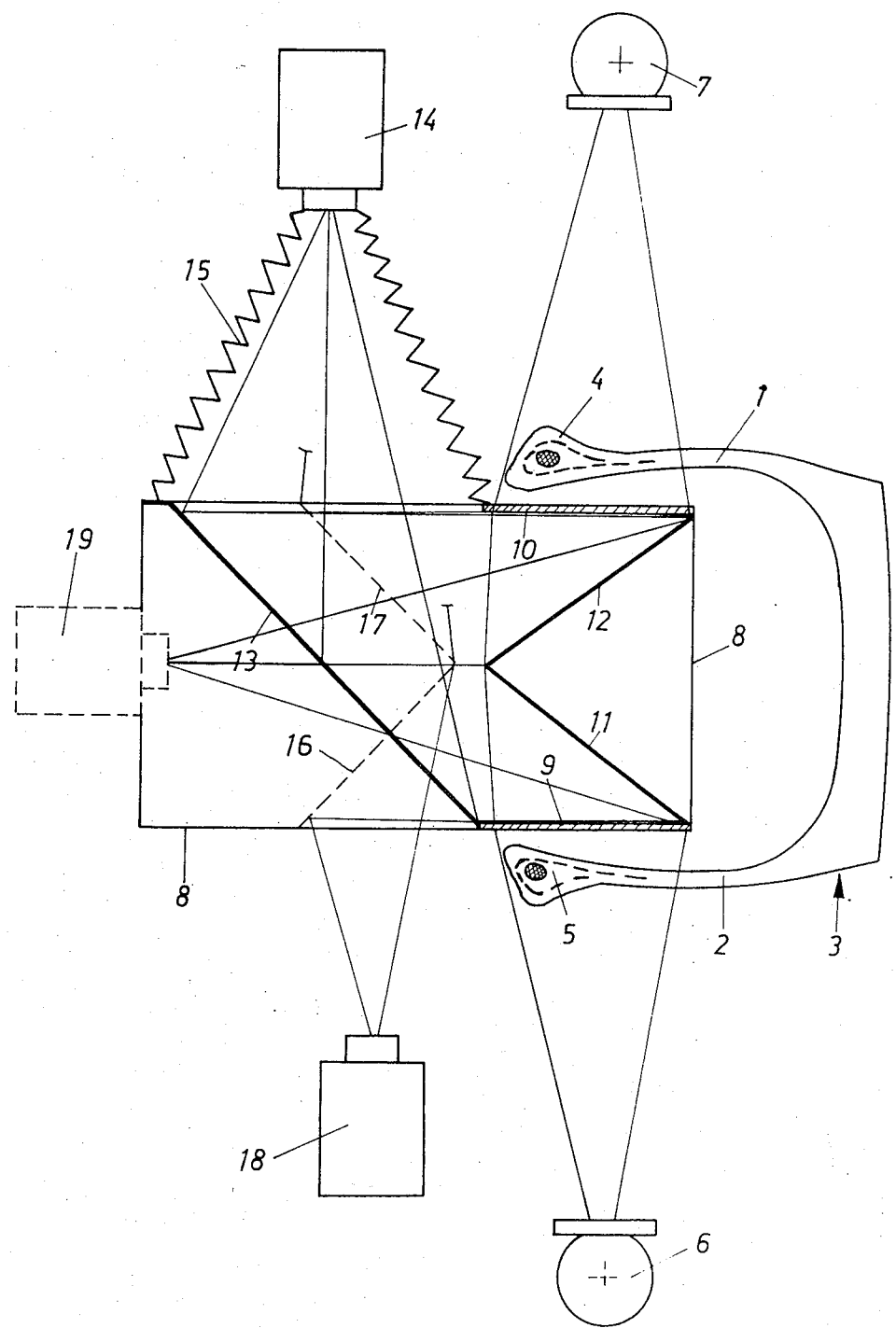

3,793,526

APPARATUS FOR THE SIMULTANEOUS X-RAY EXAMINATION OF BOTH SIDE WALLS OF A MOTOR VEHICLE TIRE

The present invention relates to apparatus for the simultaneous, continuous X-ray examination of both side-walls of a drivable motor vehicle tire, which is supported in an expanded state, by means of two X-ray tubes and two fluorescent screens with subsequent mirrors to reflect the pictures on the fluorescent screens into a sensing camera apparatus with reproduction on monitors.

The side-walls of the tire to be examined by X-rays, is so irrediated with such apparatus that the X-ray tubes provided on both sides of the tire do not irradiate the side-wall of the tire adjacent to them but the side-wall which is remote therefrom. The fluorescent screens associated with the side-walls of the tire, on which the X-ray picture of the irradiated side-walls of the tire becomes visible, as well as the mirrors for reflecting the picture on the fluorescent screens onto the sensing camera apparatus, are arranged outside the tire. Since this apparatus is so constructed that it surrounds the section of the tire being irradiated externally, it is of considerable size, depending on the sizes of tire to be handled, and consequently to correspondingly increased manufacturing complexity and costs.

It is therefore an object of the invention to provide apparatus capable of examining by X-irradiation the side-walls of a motor vehicle tire in a single revolution of the tire, which apparatus is both small and simple in construction and is also cheap to manufacture.

This object is achieved by disposing the fluorescent screens of such apparatus, together with the mirrors, at least partly in the air-space in the tire and by situating each X-ray tube opposite the tire side-wall to be irradiated.

Other objects and advantages will become apparent from a perusal of the description to follow.

Advantageously the fluorescent screens are flat and situated parallel or substantially parallel to the two side walls of the tire and to each other within the air-space of the tire. A further feature is that with each fluorescent screen there is associated a flat mirror inclined thereto, with the reflecting surface thereof facing the open area of the tire between the two beads, the angle of inclination between the mirrors and the fluorescent screens preferably being 45°. A further feature is that a common flat mirror is provided within the inner periphery of the tire and is situated opposite the aforementioned mirros, the reflecting surface of which common mirror extends parallel or substantially parallel to the reflecting surface of one of the aforementioned mirrors and reflects the two pictures on the fluorescent screens to a sensing camera.

This arrangement produces a small, easily constructed and cheaply manufactured device for the X-ray examination of the side-walls of a tire during a single rotation of the tire. The fluorescent screens with their associated mirrors are accommodated in the interior of the air-space during examination of the tire, while a further re-directing mirror is provided within the inner periphery of the tire formed by the tire-beads and in close proximity to the former, this re-directing mirror reflecting the pictures on the fluorescent screens received from the first mirrors mentioned to the sensing camera which is positioned laterally outside the tire. A monitor is arranged in a manner known *per se* subsequent to this camera and the irradiated side-walls of the tire can be examined visually on its display screen. It is clear that a considerable part of the X-ray checking device can be kept small and compact as a result of the principle of this solution, so that easier and quicker examination of the tires results since the proposed apparatus is more easily manageable than those hitherto available.

In order that the invention may be more clearly understood, reference will now be made to the accompanying largely schematic drawing illustrating one embodiment and referring to others, by way of example.

Referring now to the drawing, only the side-walls 1 and 2 of a tire 3, in particular the area of the side-walls having the tire-beads 4 or 5, are to be examined by means of X-rays. For this, the tire 3 is rotatably mounted with its side-walls spread apart, the side-walls extending in parallel or substantially parallel fashion, and is rotated for example by a drive means of any known kind and not illustrated, engaging on the tire-tread. The mounting and the drive of the tire 3 are not specifically shown since they will be apparent to those skilled in the art and would unnecessarily complicate the drawing.

According to a first embodiment, X-ray tubes 6 and 7 are situated opposite the side-walls to be irradiated such that the beam-centre of each X-ray tube extends at right angles or substantially at right angles to the corresponding side-walls. Two fluorescent screens 9, 10 situated opposite one another are arranged in a housing 8 which is able to be introduced at least partly into the interior of the air-space in the tire, which screens come into position parallel or substantially parallel to the side-walls 1, 2 when the housing is introduced into the air-space, so that an undistorted X-ray picture appears on the fluorescent screens when the side-walls are irradiated. With each fluorescent screen 9, 10 is associated a flat mirror 11, 12 extending at an inclination to it, and having a reflecting surface which faces the open area of the tire 3 between the tire-beads 4, 5. The mirrors 11, 12 are inclined with respect to their associated fluorescent screens 9, 10 at an angle preferably of 45°. Opposite the reflecting surfaces of the mirrors 11, 12 is situated a common flat mirror 13 in the housing 8, which receives the two X-ray pictures from the fluorescent screens 9, 10 which are reflected by the mirrors 11, 12, and reflects them once again. For this purpose, the mirror 13 is so arranged, bearing in mind the fact that the beam paths between the fluorescent screens and the sensing camera hereinafter referred to, must be of equal length or of approximately equal length to produce a checking picture with sufficient uniformity of definition, that part of its reflecting surface extends parallel or substantially parallel to the reflecting surface of one of the mirrors 11 or 12, while the other part of its reflecting surface extends at right angles, or approximately at right angles, to the reflecting surface of the other one of the mirrors.

The mirror 13 reflects the pictures on the fluorescent screens projected onto it *in toto* to a sensing camera 14 provided outside the housing 8 and the tire 3, having a monitor to reproduce the irradiated side-walls 1, 2 of the tire which are to be examined by visual means. Advantageously, the optical system of the sensing camera 14 is protected against disruptive external factors by a light-excluder 15, a concertina bellows for example, which connect the camera to the housing 8. The camera 14 is so arranged relative to the mirror 13 that its optical axis strikes the mirror 13 at or about an angle of 45°. Furthermore, the distance between the mirrors 11, 12 and the common mirror 13 can be kept small; care need only be taken that the mirror 13 does not reflect back or the mirror 11 (or 12). To irradiate or examine the side-walls of the tire, the housing is only introduced into the air-space in the tire 2, at the maximum, to the extent that the mirror 13 comes to rest within and in close proximity to the inner periphery of the tire formed by the beads 4, 5 so that the pictures on the fluorescent screens can be reflected to the lateral sensing camera 14 without difficulty.

In a further embodiment of the invention, the common mirror 13 of the actual embodiment shown, is omitted and two further individual mirrors 16, 17 (shown in dotted lines) are arranged in the housing 8 in its place, and symmetrically inclined to the aforementioned mirrors 11 or 12. Whereas the sensing camera 14 is then associated with the mirror 17, a second sensing camera 18 on the other side of the housing 8 is associated with the mirror 16. Both sensing cameras 14, 18 are naturally aligned with the appropriate mirror 17 or 18 in a similar way to that explained above, and there is also a further light-excluder 15 for the camera 18, but this has not been shown. A monitor (not shown) can be arranged subsequent to each of the cameras 14 and 18 or the cameras can be connected together to an image-mixer to which only a single monitor is then connected. In the first case, the X-ray picture of the appropriate side-wall of the tire appears on each monitor, and, in the latter case, both X-ray pictures appear next to one another on the same monitor screen.

In a further embodiment, a sensing camera 19 (shown dotted) is so arranged on the housing 8 directly opposite the aforementioned mirrors 11, 12 that it receives both X-ray pictures reflected from the mirrors 11, 12 and passes them to the monitor arranged subsequent to it. This embodiment can be considered useful for larger tires since, where smaller tires are concerned, there is not sufficient room for the housing 8 and the sensing camera 19 inside the inner periphery of the tire. As a modification of this embodiment, an optical connecting system situated opposite the mirrors 11, 12 may be secured on or in the housing 8 in place of the camera 19 and is coupled to a known fibre-optic light conductor (not shown). At the other end, the fibre-optic is connected to a sensing camera with a monitor, the camera being provided at a point where it is not in the way.

Advantageously, the housing 8 and the sensing camera 14 or the sensing cameras 14, 18 are arranged on a common frame which, for clarity of the drawing, is not shown and can readily be produced by a man skilled in the art in the light of the specific requirements. The same also applies to the mounting of the X-ray tube 6 and 7 which can either be arranged on the common frame or on another construction separate therefrom. The particular form of frame selected must in every case be such that the part of the housing 8 having the fluorescent screens can physically be brought into the air-space in the tire.

We claim:

1. Apparatus for the simultaneous, continuous X-ray examination of both side-walls of a drivably mounted expanded motor vehicle tire, by means of two X-ray tubes and two fluorescent screens with mirrors arranged subsequent to them to reflect the pictures on said fluorescent screens to a sensing-camera arrangement with reproduction on monitors, the invention which consists in that said fluorescent screens arranged for location at least partly within the air-space of the tire, together with said mirrors, and in that each said X-ray tube is situated opposite the side-wall of the tire facing it, and which is to be irradiated.

2. Apparatus according to claim 1, wherein said fluorescent screens are situated at least substantially approximately parallel to each other and to the two side-walls of the tire within its air space.

3. Apparatus according to claim 2, wherein a flat mirror is disposed at an inclination to each said fluorescent screen and with its reflecting surface facing the open area of the tire between the two peripheral edges thereof.

4. Apparatus according to claim 3, wherein the angle of inclination between said mirrors and said fluorescent screens is 45°.

5. Apparatus according to claim 4, wherein a common flat mirror is located within the inner periphery of the tire and opposite said mirrors and the reflecting surface of said common flat mirror extends at least substantially parallel to the reflecting surface of one of said first mentioned mirrors and reflects the two pictures on said fluorescent screens to a sensing camera.

6. Apparatus according to claim 4, wherein two further mirrors are provided within the inner periphery of the tire each at a symmetrical angle to the reflecting surface of one of said first-mentioned mirrors, said two further mirror reflecting the picture on their respective fluorescent screens separately to two sensing cameras each said camera having a monitor or an image-mixer and a single monitor.

7. Apparatus according to claim 4, wherein a sensing camera for receiving the pictures on both said fluorescent screens and having a monitor, is situated opposite said mirrors.

8. Apparatus according to claim 4, wherein there is provided an optical system for receiving the pictures on both said fluorescent screens, said optical system being situated opposite said mirrors and being coupled to one end of an optical-fibre light conductor, the other end of which is connected to a sensing camera.

* * * * *